United States Patent
McCaffrey (10) Patent No.: US 9,501,469 B2
(45) Date of Patent: Nov. 22, 2016

(54) ANALOGY FINDER

(71) Applicant: University of Massachusetts, Boston, MA (US)

(72) Inventor: Anthony McCaffrey, West Brookfield, MA (US)

(73) Assignee: University of Massachusetts, Boston, MA (US)

( * ) Notice: Subject to any disclaimer, the term of this patent is extended or adjusted under 35 U.S.C. 154(b) by 20 days.

(21) Appl. No.: 14/085,897

(22) Filed: Nov. 21, 2013

(65) Prior Publication Data

US 2014/0180677 A1 Jun. 26, 2014

Related U.S. Application Data

(60) Provisional application No. 61/728,924, filed on Nov. 21, 2012.

(51) Int. Cl.
*G06F 17/27* (2006.01)
*G06F 17/30* (2006.01)

(52) U.S. Cl.
CPC ....... *G06F 17/2795* (2013.01); *G06F 17/2775* (2013.01); *G06F 17/30654* (2013.01)

(58) Field of Classification Search
CPC .............. G06F 17/2785; G06F 17/30672; G06F 17/30398; G06F 17/30657; G06F 17/30734; G06N 5/02
USPC ............ 704/9; 707/780, 772, 758, 728, 707, 707/706, 705; 706/53, 46; 434/322
See application file for complete search history.

(56) References Cited

U.S. PATENT DOCUMENTS

| | | | |
|---|---|---|---|
| 6,167,370 A | 12/2000 | Tsourikov | |
| 6,611,825 B1 | 8/2003 | Billheimer | |
| 7,120,574 B2 | 10/2006 | Troyanova | |
| 7,567,917 B2 | 7/2009 | Miller | |
| 7,606,418 B2 | 10/2009 | Mizoo | |
| 7,672,831 B2 | 3/2010 | Todhunter | |
| 7,962,326 B2 | 6/2011 | Tsourikov | |
| 8,602,793 B1 * | 12/2013 | Sniedzins | G09B 5/00 434/322 |
| 8,700,620 B1 * | 4/2014 | Lieberman | G06F 17/30731 707/728 |
| 8,838,659 B2 * | 9/2014 | Tunstall-Pedoe | G06N 5/02 706/47 |
| 8,880,547 B1 * | 11/2014 | Mills | G06F 17/30 707/767 |
| 8,892,554 B2 | 11/2014 | Carmel | |
| 8,909,516 B2 * | 12/2014 | Medero | G06F 17/27 704/1 |
| 8,924,198 B2 * | 12/2014 | Prompt | G06F 17/2881 704/1 |

(Continued)

OTHER PUBLICATIONS

Mechanical and Industrial Engineering, McCaffrey Develops Toolkit for Boosting Problem-solving Skills, (Feb. 2012).

(Continued)

*Primary Examiner* — Michael Colucci
(74) *Attorney, Agent, or Firm* — Robert Plotkin, P.C.; Robert Plotkin, Esq.

(57) ABSTRACT

A user provides a query that includes at least two of a subject, a predicate, and an object. A computer system identifies synonyms of one or more of the subject, predicate, and object, and forms new queries from the identified synonyms. The system searches a dataset using the new queries, and possibly also using the user-provided query, to produce search results. The system may process the search results, such as by filtering and/or sorting them. The system provides output representing the search results to the user. The user may use the search result output to identify answers that are analogous to answers to the query originally provided by the user.

34 Claims, 2 Drawing Sheets

(56) References Cited

U.S. PATENT DOCUMENTS

| | | | |
|---|---|---|---|
| 8,943,094 B2* | 1/2015 | Brown | G06F 17/273 704/275 |
| 8,954,428 B2 | 2/2015 | Chitiveli | |
| 2003/0233224 A1 | 12/2003 | Marchisio | |
| 2005/0027691 A1 | 2/2005 | Brin | |
| 2007/0282811 A1* | 12/2007 | Musgrove | G06F 17/30672 |
| 2008/0065603 A1 | 3/2008 | Carlson | |
| 2008/0104071 A1* | 5/2008 | Pragada | G06F 17/3043 |
| 2008/0154828 A1* | 6/2008 | Antebi | G06N 5/022 706/46 |
| 2008/0195570 A1* | 8/2008 | Alsafadi | G06F 19/28 706/53 |
| 2009/0070322 A1* | 3/2009 | Salvetti | G06F 17/30616 |
| 2009/0094190 A1 | 4/2009 | Stephens | |
| 2009/0094629 A1 | 4/2009 | Lee | |
| 2009/0100053 A1* | 4/2009 | Boschee | G06F 17/30705 |
| 2009/0112828 A1 | 4/2009 | Rozenblatt | |
| 2009/0119095 A1* | 5/2009 | Beggelman | G06F 17/2785 704/9 |
| 2009/0150919 A1 | 6/2009 | Lee | |
| 2009/0249184 A1 | 10/2009 | Dieberger | |
| 2010/0070517 A1* | 3/2010 | Ghosh | G06F 17/30734 707/758 |
| 2010/0094845 A1 | 4/2010 | Moon | |
| 2010/0281025 A1 | 11/2010 | Tsatsou | |
| 2010/0306123 A1 | 12/2010 | Cai | |
| 2011/0022635 A1* | 1/2011 | Michael | G06F 17/30398 707/780 |
| 2011/0035211 A1 | 2/2011 | Eden | |
| 2011/0161070 A1* | 6/2011 | Chen | G06F 17/2785 704/9 |
| 2011/0173174 A1* | 7/2011 | Flitcroft | G06F 17/30864 707/707 |
| 2011/0190035 A1 | 8/2011 | Vandenheuvel | |
| 2011/0295823 A1* | 12/2011 | Sathish | G06F 17/30294 707/705 |
| 2011/0301941 A1* | 12/2011 | De Vocht | G06F 17/2715 704/9 |
| 2012/0254143 A1* | 10/2012 | Varma | G06F 17/30401 707/706 |
| 2013/0151236 A1* | 6/2013 | Iofinov | G06F 17/30327 704/9 |
| 2014/0059078 A1* | 2/2014 | Gulwani | G06F 17/30672 707/772 |
| 2014/0289389 A1 | 9/2014 | George | |

OTHER PUBLICATIONS

Challoner, J., Editor, (2009), 1,001 Inventions that changed the world. Quintessence, London, England; Barron\s Educational Series, Hauppauge, NY.

Gick et al., Analogical Problem Solving, Cognitive Psychology, vol. 12, pp. 306-355, 1980.

Gick et al., Schema Induction and Analogical Transfer, Cognitive Psychology, vol. 15, pp. 1-38, 1983.

Jansson, D. G., & Smith, S. M. (1991). Design fixation. Design Studies, 12(1), 3-11.

McCaffrey, T., & Spector, L., (2012). Behind every innovative solution lies an obscure feature. Knowledge Management and E-Learning. Special issue on Supporting, Managing, & Sustaining Creativity and Cognition through Technology, 4(2), p. 146-156. (Jun. 13, 2012).

McCaffrey, T., & Spector. L., (Nov. 11, 2011). Innovation is built upon the obscure: Innovation-enhancing software for uncovering the obscure. In A. K. Goel, F. Harrell, B. Magerko, Y. Nagai, & J. Prophet (Eds.), Proceedings of the 8th ACM Conference on Creativity and Cognition (pp. 371-372). New York, NY: Association for Computing Machinery.

McCaffrey, T. & Domb, E. (2011). Seeing the invisible: A systematic approach to uncovering hidden resources. Proceedings of the. 6th Ibero American Congress on Technological Innovation, p. 7-15 (Oct. 20-22, 2011).

McCaffrey, T. & Spector. L. (2011). How the Obscure Features Hypothesis leads to innovation assistant software, Proceedings of the Second International Conference on Computational Creativity, p. 120-122. (Apr. 20, 2011).

Wittgenstein, L. (1953). Philosophical Investigations (G. E. M. Anscombe, Trans). New York: Macmillan, pp. 193-198.

* cited by examiner

ANALOGY FINDER

STATEMENT REGARDING FEDERALLY SPONSORED RESEARCH OR DEVELOPMENT

This invention was made with government support under Grant Nos. IIP1261052 and IIP1127609 from the National Science Foundation. The government has certain rights in the invention.

BACKGROUND

"Design fixation" is the tendency to fixate on the features of known solutions when trying to create novel solutions (Jansson & Smith, 1991). For example, a subject who is shown an existing chair and then asked to design an improved chair is likely to fixate on features of the existing chair when attempting to design an improved chair. Such fixation can lead the subject to overlook features that would be useful to include in an improved chair, but which are lacking in the existing chair.

Furthermore, it is well known that people struggle with recognizing analogous solutions that are provided to them before working on a particular problem. In an experiment, a story can be read before a problem is provided. The story contains an analogous solution. Without explicit hints, very few subjects (e.g., only about 10%) recognize the analogy and transfer the solution to the problem on which they are assigned to work (Gick and Holyoak, 1980, 1983). As these experiments demonstrate, it is difficult for people to transfer analogies from one situation to another.

SUMMARY

A user provides a query that includes at least two of a subject, a predicate, and an object. A computer system identifies synonyms of one or more of the subject, predicate, and object, and forms new queries from the identified synonyms. The system searches a dataset using the new queries, and possibly also using the user-provided query, to produce search results. The system may process the search results, such as by filtering and/or sorting them. The system provides output representing the search results to the user. The user may use the search result output to identify answers that are analogous to answers to the query originally provided by the user.

For example, one embodiment of the present invention is directed to a method performed by at least one computer processor. The method includes: (A) obtaining predicate data representing a predicate; (B) obtaining object data representing an object of the predicate; (C) identifying a synonym of the predicate; (D) identifying a synonym of the object; (E) forming a query from the synonym of the predicate and the synonym of the object; and (F) searching a dataset using the query to identify a subset of the dataset.

DETAILED DESCRIPTION

Embodiments of the present invention may be used to alleviate design fixation and to promote analogy transfer in a variety of ways. For example, embodiments of the present invention may be used to obtain a query taking the form of "subject predicate object" or "predicate object" (where the subject is a first noun phrase, the predicate is a verb phrase, and the object is a second noun phrase); obtain one or more synonyms (e.g., hypernyms and/or hyponyms) of one or more of the subject, predicate, and object; form modified queries using combinations of the subject, predicate, object and/or their synonyms; search a dataset using the modified queries; and provide the results of the search to the user. Such techniques may be used to search for and obtain search results representing analogs to the search results that would have been found using the original query provided by the user.

Consider an example in which the user enters a query describing a desired result to be achieved, such as "reduce vibrations," in which "reduce" is the predicate and in which "vibrations" is the object. Embodiments of the present invention may obtain a synonym of "reduce," such as "minimize," and form a first revised query from this synonym and the original object, e.g., "minimize vibrations." As another example, embodiments of the present invention may obtain a synonym of "vibrations," such as "oscillations," and form a second revised query from this synonym and the original predicate, e.g., "reduce oscillations." As yet another example, embodiments of the present invention may form a third revised query from the synonym of the predicate and the synonym of the object, e.g. "minimize oscillations." Embodiments of the present invention may then search a dataset using some or all of the first, second, and third revised queries, and possibly also using the original query submitted by the user. Embodiments of the present invention may then provide the results of some or all of such searches to the user. Similar techniques may be applied to queries of the form "subject predicate object," such as "fluid reduces vibrations."

Any of the techniques disclosed herein which obtain synonyms of a particular term, phrase, or query as a whole, may be used to obtain antonyms of the particular term, phrase, or query as a whole. For example, the techniques disclosed herein may be used to obtain an antonym of the predicate (e.g., "reduce") and an antonym of an object (e.g., "vibrations") in a query to produce a first revised query from the two synonyms, e.g., "increase stability." As another example, the techniques disclosed herein may be used to obtain an antonym of the subject (e.g., "fluid") and an antonym of a predicate (e.g., "reduces") in a query to produce a second revised query from the two antonyms, e.g., "solids increase." As another example, the techniques disclosed herein may be used to obtain an antonym of the subject (e.g., "fluid") and an antonym of an object (e.g., "vibrations") in a query to produce a third revised query from the two antonyms, e.g., "solid stability." As described in more detail below, any computer-generated antonyms of a particular term (e.g., subject, predicate, or object), phrase, or query may be modified and/or supplemented by the input of a human user.

Search results produced using the techniques summarized above are likely to include data records (such as web pages, patents, or other documents) that contain information related not only to the result described explicitly by the user-submitted query (i.e., reducing vibrations), but also data records that contain information related to results that are analogous to the result described by the user-submitted query. The techniques summarized above, therefore, may be used to assist the user in identifying analogous solutions to the problem described by the user-submitted query.

Figure 1:
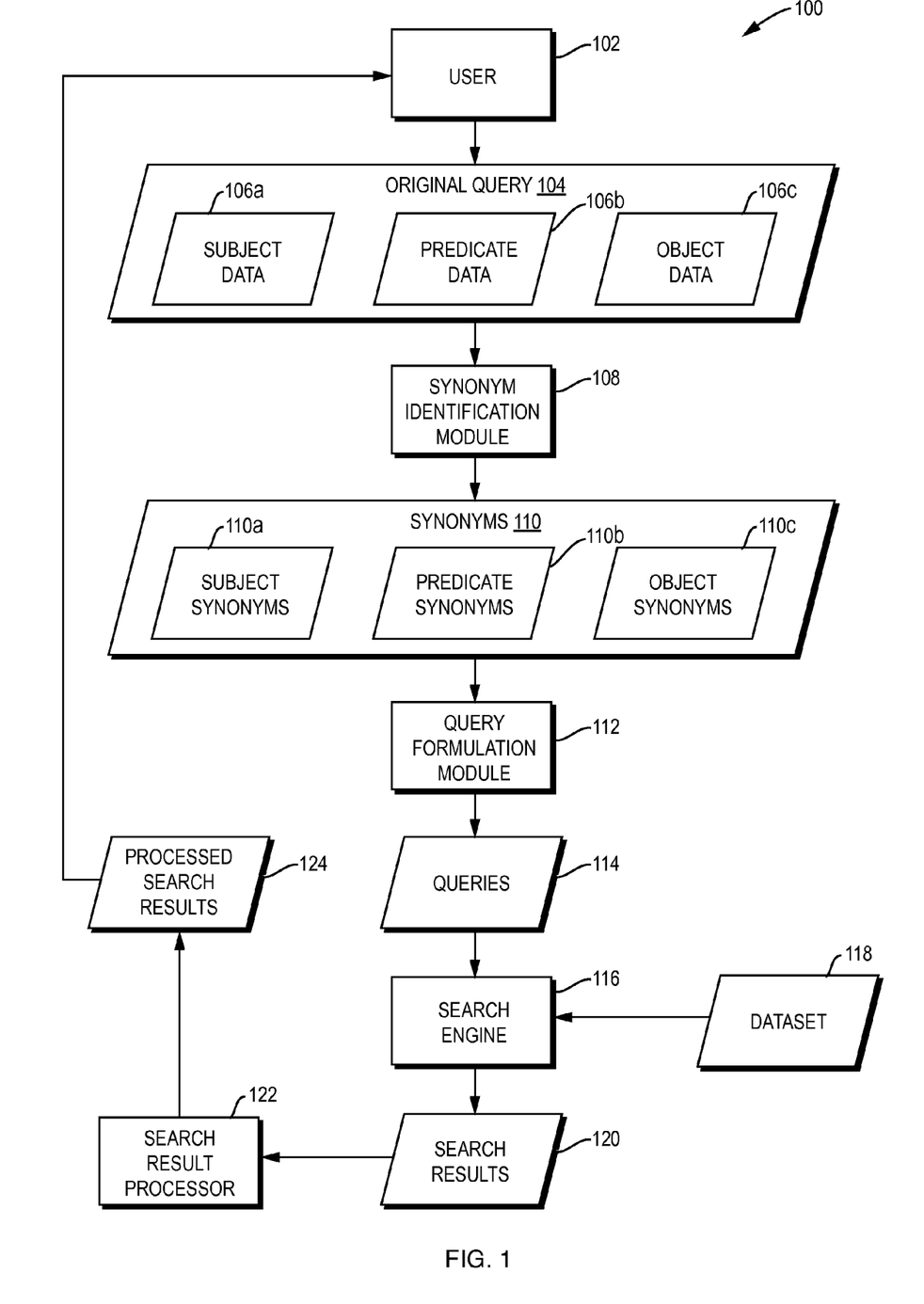
FIG. 1 is a dataflow diagram of a system for assisting in overcoming design fixation by searching a dataset using queries that are analogous to a query specified by a user according to one embodiment of the present invention.
Figure 2:
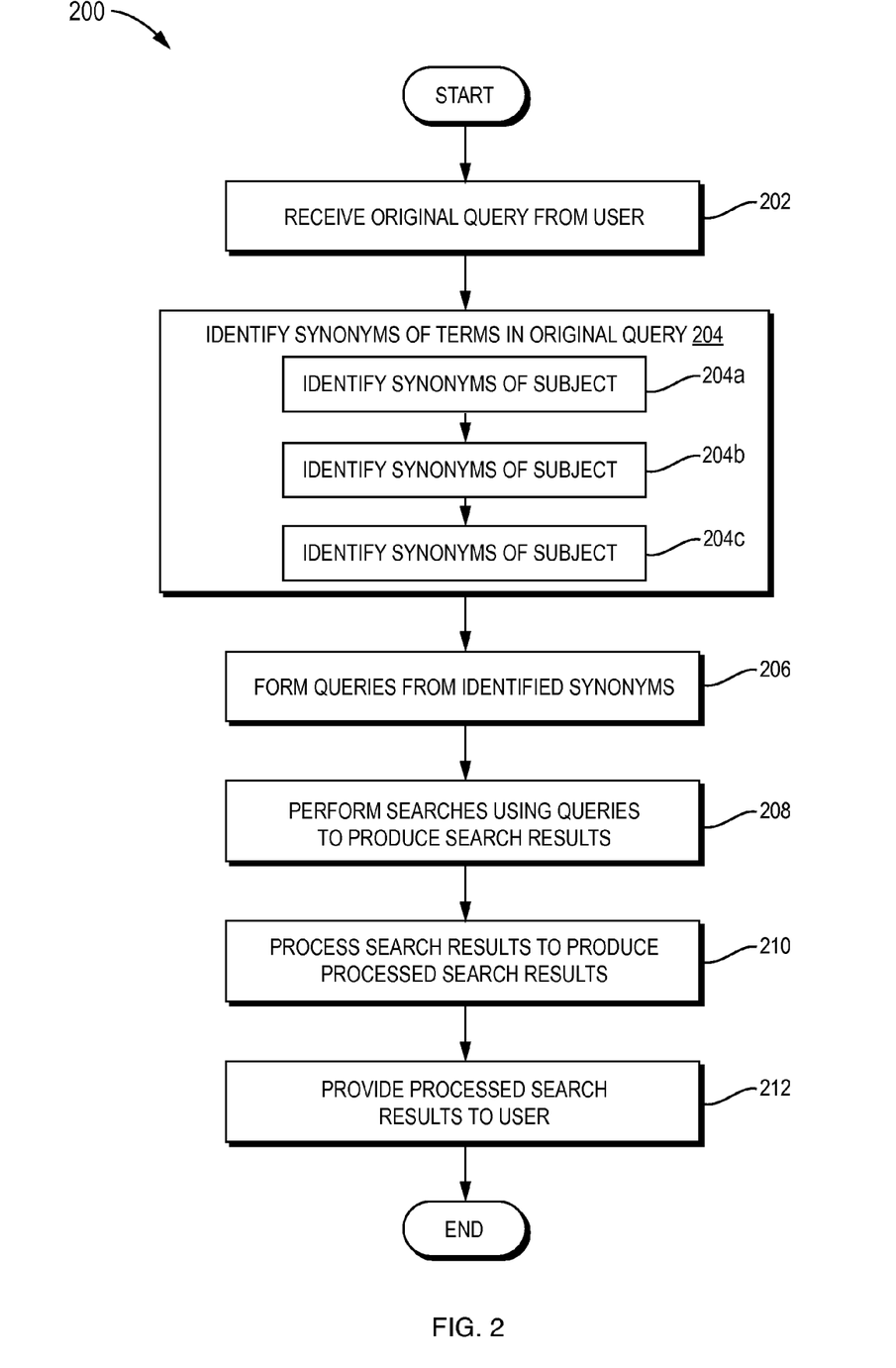
FIG. 2 is a flowchart of a method performed by the system of FIG. 1 according to one embodiment of the present invention.

Having described in general certain features of embodiments of the present invention, particular embodiments of the present invention will now be described in more detail. Referring to FIG. 1, a dataflow diagram is shown of a system 100 for finding data that is analogous to the answer to a query provided by a user according to one embodiment of the present invention. Referring to FIG. 2, a flowchart is shown of a method 200 that is performed by the system 100 of FIG. 1 according to one embodiment of the present invention.

A user 102 provides a query 104 to the system 100 (FIG. 2, operation 202). The query 104 is referred to herein as the "original query" to distinguish it from other queries referred to herein.

The original query 104 may take a variety of forms. For example, in FIG. 1 the query 104 is shown as containing subject data 106a representing a subject, predicate data 106b representing a predicate, and object data 106c representing an object. For example, the subject data 106a may be the text "fluid," the predicate data may be the text "reduces," and the object data 106c may be the text "vibrations." In general, the subject represented by the subject data 106a is a subject of the predicate represented by the predicate data 106b, and the object represented by the object data 106c is an object of the predicate represented by the predicate data 106b.

The subject data 106a may, for example, be or represent a first noun phrase containing one or more words (also signified herein as "nounPhrase1"). The predicate data 106b may, for example, be or represent a verb phrase containing one or more words (also signified herein as "verbPhrase"). The term "predicate" as used herein is synonymous with "verb phrase" and is not limited to any particular type of verb phrase. The object data 106c may, for example, be or represent a second noun phrase containing one or more words (also signified herein as "nounPhrase2").

Any of these three phrases may be expressed in any natural language, artificial language, or any combination thereof. Any of these three phrases may be singular or plural (e.g., "fluid" or "fluids"), be conjugated in any manner (e.g., "reduce" or "reduces"), and be expressed in any tense (e.g., "reduce," "reduced," or "reducing"). The system 100 may perform any of a variety of pre-processing on any of these three phrases, such as any kind of stemming, to produce modified versions of one or more of the three phrases, which may then be used in addition to or instead of the original versions of the three phrases in any of the processing disclosed herein.

The query 104 need not include all three of the subject data 106a, predicate data 106b, and object data 106c. For example, the query 104 may include the subject data 106a and predicate data 106b, but not the object data 106c (e.g., "fluid reduces"). As another example, the query 104 may include the predicate data 106b and the object data 106c, but not the subject data 106a (e.g., "reduce vibrations").

More generally, the query 104 may include any two of the subject data 106a, the predicate data 106b, and the object data 106c. Each of the subject data 106a, the predicate data 106b, and the object data 106c may represent a corresponding part of a sentence. More specifically, the subject data 106a may represent a subject of a sentence, the predicate data 106b may represent a predicate of the sentence, and the object data 106c may represent an object of the sentence. Therefore, in general, the query 104 may include both: (1) first data (e.g., a first one of the subject data 106a, the predicate data 106b, and the object data 106c) representing a first part of a sentence, and (2) second data (e.g., a second one of the subject data 106a, the predicate data 106b, and the object data 106c) representing a second part of the sentence. The query 104 may further include third data (e.g., a third one of the subject data 106a, the predicate data 106b, and the object data 106c) representing a third part of the sentence.

Techniques disclosed specifically herein in connection with the subject data 106a (and the subject that it represents), the predicate data 106b (and the predicate that it represents), and the object data 106c (and the object that it represents) may be understood more generally to apply to any other data representing a part of a sentence. For example, techniques disclosed specifically herein in connection with the subject data 106a (and the subject that it represents) may be understood more generally to apply to the predicate data 106b (and the predicate that it represents) and to the object data 106c (and the object that it represents).

The query 104 may include data in addition to that shown in FIG. 1. For example, the query 104 may include additional terms, such as any one or more of the following: prepositions, adjectives, adverbs, additional noun phrases, and additional verb phrases. Such additional terms may be used as further constraints to narrow the search performed by the search engine 116. For example, the query "fluid reduces vibrations under low temperature" includes the additional phrase "under low temperature," which consists of a preposition ("under") and a noun phrase ("low temperature"). In turn, the noun phrase consists of an adjective ("low") and a noun ("temperature"). This additional phrase may be used as an additional constraint to narrow the query "fluid reduces vibrations." The additional constraints need not be literal, but may be enforced after semantic manipulation. For example, if the phrase "under low temperature" is input as an additional term in the query 104, the synonym identification module 108 may create one or more synonyms of this phrase, such as "beneath freezing," "zero degree Celsius or below," and "less than 32 degrees Fahrenheit." The additional constraints may then be enforced using the original additional phrase ("under low temperature") and/or any of the automatically-generated synonyms.

The user 102 may provide the query 104 in any of a variety of ways. For example, the user 102 may type, speak, select, or otherwise input text representing any one or more of the subject data 106a, predicate data 106b, and object data 106c. For example, the user 102 may type, speak, or otherwise input a single contiguous text string containing some or all of the subject data 106a, predicate data 106b, and object data 106c in sequence, possibly separated by spaces, tabs, line breaks, or other delimiters. For example, the user 102 may type, speak, or otherwise input a single contiguous text string containing both the subject data 106a and the predicate data 106b in sequence (e.g., "fluid reduces"), a single contiguous text string containing both the predicate data 106b and the object data 106c in sequence (e.g., "reduces vibrations"), or a single contiguous text string containing the subject data 106a, the predicate data 106b, and the object data 106c in sequence (e.g., "fluid reduces vibrations").

The system 100 may assist the user 102 in providing the query 104 in any of a variety of ways. For example, the user 102 may provide an initial version of the query 104 as input to the system 100. In response, the system 100 may identify each verb phrase in the initial version of the query 104, or use conventional text analytic techniques to identify the primary verb in the initial version of the query 104. The system 100 may then provide output prompting the user 102 to indicate whether each identified verb phrase characterizes the essential process the user 102 is attempting to define. In response, the user 102 may provide input either confirming or disconfirming that a particular verb phrase characterizes the essential process the user 102 is attempting to define. If the input received from the user 102 confirms that a particular verb phrase characterizes the essential process the user 102 is attempting to define, then the system 100 may, in response, retain the verb phrase in the query 104.

If the input received from the user 102 does not confirm that a verb phrase characterizes the essential process the user 102 is attempting to define, then the system 100 may, in response, take any of a variety of actions, such as removing the verb phrase from the query 104, or prompting the user 102 to provide an alternate verb phrase, receiving an alternate verb phrase from the user, and replacing the original verb phrase with the alternate verb phrase provided by the user 102. In the latter case, the system 100 may assist the user 102 in providing the alternate verb phrase in any of a variety of ways. For example, the system 100 may automatically identify one or more synonyms (e.g., hypernyms and/or hyponyms) of the original verb phrase and display those synonyms to the user 102. The system 100 may display the synonyms in any way, such as in a list, or in the form of a hierarchy in which the parent/child relationships among hypernyms and hyponyms is displayed graphically.

Regardless of how the synonyms are selected and displayed to the user 102, the user 102 may select one or more of the displayed synonyms, in response to which the system 100 may replace the original verb phrase in the query with the synonym(s) selected by the user 102. The system 100 may enable the user 102 to select such synonyms in any of a variety of ways, such as by clicking on them or otherwise selecting them with a pointing device (e.g., mouse, touchpad, or touchscreen), or by typing their initial letters.

The system 100 may apply the same or similar techniques to assist the user 102 in removing and/or replacing noun phrases in the original version of the query 104.

The system 100 includes a synonym identification module 108, which receives the original query 104 as input and identifies one or more synonyms for each of one or more of the subject data 106a, the predicate data 106b, and the object data 106c (FIG. 2, operation 204). More specifically, the synonym identification module 108 may identify, and produce as output, subject synonym data 110a representing one or more synonyms of the subject represented by the subject data 106a (FIG. 2, operation 204a). Similarly, the synonym identification module 108 may identify, and produce as output, predicate synonym data 110b representing one or more synonyms of the predicate represented by the predicate data 106b (FIG. 2, operation 204b). Similarly, the synonym identification module 108 may identify, and produce as output, object synonym data 110c representing one or more synonyms of the object represented by the object data 106c (FIG. 2, operation 204c).

As mentioned above, the original query 104 need not include all three of the subject data 106a, the predicate data 106b, and the object data 106c. The synonym identification module 108 need not identify synonyms of any data not contained within the original query 104. More specifically, the synonym identification module 108 need not identify synonyms of the subject data 106a if the original query 104 does not include the subject data 106a; the synonym identification module 108 need not identify synonyms of the predicate data 106b if the original query 104 does not include the predicate data 106b; and the synonym identification module 108 need not identify synonyms of the object data 106c if the original query 104 does not include the object data 106c.

Furthermore, the synonym identification module 108 need not identify synonyms of all data contained within the original query 104. For example, if the original query contains only the subject data 106a and the predicate data 106b, then the synonym identification module 108 may, but need not, identify synonyms for both the subject data 106a and the predicate data 106b. Instead, the synonym identification module 108 may identify synonyms for only the subject data 106a and not the predicate data 106b, or for only the predicate data 106b and not the subject data 106a. Similarly, if the original query contains only the predicate data 106b and the object data 106c, then the synonym identification module 108 may, but need not, identify synonyms for both the predicate data 106b and the object data 106c. Instead, the synonym identification module 108 may identify synonyms for only the predicate data 106b and not the object data 106c, or for only the object data 106c and not the predicate data 106b. Finally, if the original query contains the subject data 106a, the predicate data 106b, and the object data 106c, then the synonym identification module 108 may, but need not, identify synonyms for all three of the subject data 106a, the predicate data 106b, and the object data 106c. Instead, the synonym identification module 108 may identify synonyms for only one but not the other two of the subject data 106a, the predicate data 106b, and the object data 106c; or for only two but not three of the subject data 106a, predicate data 106b, and object data 106c.

The synonym identification module 108 may identify any type(s) of synonyms for the subject data 106a, predicate data 106b, and object data 106c in any manner. For example, the synonym identification module 108 may identify the synonyms 110 using a publicly-available database, such as WordNet from Princeton University or Thesaurus.com. The synonyms 110 identified by the synonym identification module 108 may include, for example, hyponyms and/or hypernyms of the subject, predicate, and object.

The synonym identification module 108 may identify any number of synonyms for each of the subject data 106a, predicate data 106b, and object data 106c. The synonym identification module 108 may, for example, identify a different number of synonyms for the subject data 106a than for the predicate data 106b, and/or a different number of synonyms for the predicate data 106b than the object data 106c.

The synonym identification module 108 may initially identify an initial set of synonyms and then enable the user 102 to select a subset of the initial set of synonyms for inclusion in the final set of synonyms 110. For example, the synonym identification module 108 may initially identify all available synonyms of a particular term in the query 104 (e.g., the subject 106a) and enable the user 102 to select a subset of those synonyms for inclusion in the final set of synonyms 110. The synonym identification module 108 may, for example, display or otherwise provide output representing the initial set of synonyms to the user 102 in any way, such as in a list, or in the form of a hierarchy in which the parent/child relationships among hypernyms and hyponyms is displayed graphically. The user 102 may then provide input selecting one or more of the displayed synonyms, in response to which the system 100 may include the selected synonyms, but not the un-selected synonyms, in the final set of synonyms 110. Conversely, for example, the system 100 may initially select all displayed synonyms by default. The user 102 may then provide input de-selecting one or more of the displayed synonyms, in response to which the system 100 may include the still-selected synonyms, but not the synonyms de-selected by the user 102, in the final set of synonyms 110.

The user 102 may also provide input to the system 100 to specify one or more synonyms to add to the synonyms 110, such as one or more subject synonyms to add to the subject synonym data 110*a*, one or more predicate synonyms 110*b* to add to the predicate synonym data 110*b*, one or more object synonyms to add to the object synonym data 110*c*, or any combination thereof. In this way, the user 102 may supplement the synonyms automatically generated by the synonym identification module 108. The synonym identification module 108 may store a record of any user-specified synonyms, so that the synonym identification module 108 may subsequently automatically identify such synonyms in the future.

The system 100 may also include a query formulation module 112, which may form and produce as output one or more queries 114 based on some or all of the synonyms 110, possibly in combination with some or all of the original query 104 (FIG. 2, operation 206). The query formulation module 112 may produce any number of queries 114. As one extreme example, the queries 114 may consist of a single query. At the other extreme, the queries 114 may include all possible queries of the form "subject predicate," "predicate object," "subject predicate object," "subject object," "subject <verbPhrase>," "<nounPhrase> predicate," "<verbPhrase> object," or "predicate <nounPhrase>," where "subject," "predicate," and "object" are drawn from the subject synonym data 110*a* (and possibly from the original subject data 106*a*), the predicate synonym data 110*b* (and possibly from the original predicate data 106*b*), and the object synonym data 110*c* (and possibly from the original object data 106*c*), respectively. In these examples, <verbPhrase> and <nounPhrase> are variable names which represent any verb phrase or noun phrase, respectively. Therefore, for example, when the search engine 116 searches the dataset 118 for the phrase, "reduce <verbPhrase>," the search engine 116 may consider such a phrase to match text in the dataset 118 containing the word "reduce" followed by any verb phrase.

The query formulation module 112 may initially identify an initial set of queries and then enable the user 102 to select a subset of the initial set of queries for inclusion in the final set of queries 114. The query formulation module 112 may, for example, display or otherwise provide output representing the initial set of queries to the user 102 in any way, such as in a list, or in the form of a hierarchy in which the parent/child relationships among the hypernyms and hyponyms in the initial set of queries is displayed graphically. The user 102 may then provide input selecting one or more of the displayed queries, in response to which the system 100 may include the selected queries, but not the un-selected queries, in the final set of queries 114. Conversely, for example, the system 100 may initially select all displayed queries by default. The user 102 may then provide input de-selecting one or more of the displayed queries, in response to which the system 100 may include the still-selected queries, but not the queries de-selected by the user 102, in the final set of queries 114.

The user 102 may also provide input to the system 100 to specify one or more queries to add to the queries 114. The user 102 may provide such input in any of the ways described above in connection with the original query 104. In this way, the user 102 may supplement the queries 114 automatically generated by the query formulation module 112. The query formulation module 112 may store a record of any user-specified queries, so that the query formulation module 112 may subsequently automatically generate such queries based on the same original query 104 in the future.

Any particular query in the queries 114 may be of any of the following forms: "subject predicate," "predicate object," "subject predicate object," "subject object," "subject <verbPhrase>," "<nounPhrase> predicate," "<verbPhrase> object," or "predicate <nounPhrase>." The queries 114 may include any number of queries (including zero) of each of these forms, so long as the queries 114 include at least one query. The queries 114 may, therefore, include one or more queries of one form and one or more queries of another form.

The query formulation module 112 may form each query in the queries 114 by, for example: (1) selecting a form for the query (e.g., "subject predicate," "predicate object," "subject predicate object," "subject object," "subject <verbPhrase>," "<nounPhrase> predicate," "<verbPhrase> object," or "predicate <nounPhrase>"); (2) selecting, for each term of the query, a term of the corresponding type from the original query 104 or the synonyms 110; and (3) forming the query from the terms selected in (2). Note that in certain embodiments of the present invention, the query formulation module 112 only selects terms from the synonyms 110 in (2). Note further that in certain embodiments of the present invention, the query formulation module 112 selects terms in (2) such that at least one term in the resulting query is selected from the synonyms 110, so that the resulting query is not identical to the original query 104.

The only requirement is that the queries 114 include at least one query that is not identical to the original query 104, and which therefore includes at least one of the subject synonyms 110*a*, predicate synonyms 110*b*, or object synonyms 110*c*. The queries 114 may include a query that is identical to the original query 104, so long as the queries 114 include at least one other query that is not identical to the original query 104.

For example, assume that the original query 104 contains the predicate "reduce" and the object "vibrations," and that the query formulation module 112 selects the form "predicate object" for a query to generate. The query formulation module 112 may then select a predicate for use in the query to generate by selecting either the original predicate 106*b* or a predicate from the set of predicate synonyms 110*b*. Assume for purpose of example that the query formulation module 112 selects the predicate "minimize" from the predicate synonyms 110*b*. The query formulation module 112 may then select an object for use in the query to generate by selecting either the original object 106*c* or an object from the set of object synonyms 110*c*. Assume for purpose of example that the query formulation module 112 selects the object "oscillations" from the object synonyms 110*c*.

The query formulation module 112 may then form the resulting modified query by combining the selected terms (e.g., subject and predicate; predicate and object; subject, predicate, and object; subject and object; subject and verb phrase; noun phrase and predicate; verb phrase and object; or predicate and noun phrase) together in any of a variety of ways. For example, the query formulation module 112 may form the resulting modified query by forming a conjunction (i.e., logical AND) of all of the selected terms, by forming a disjunction (i.e., logical OR) of all of the selected terms, or by joining the selected terms using any Boolean operator(s) in any combination (e.g., AND, OR, XOR, NOT). As another example, the query formulation module 112 may form the resulting modified query by concatenating the selected terms into a single text string, possibly separated by spaces or other delimiters, in the sequence "subject predicate," "predicate object," "subject predicate object,"

"subject object," "subject <verbPhrase>," "<nounPhrase> predicate," "<verbPhrase> object," or "predicate <nounPhrase>."

The query formulation module 112 may form any number of queries using any combination of the techniques described above to generate the set of queries 114, which may include any number of queries that differ from the original query 104, and which may also include the original query 104.

The system 100 also includes a search engine 116, which performs searches on a dataset 118 using the queries 114 to produce search results 120 (FIG. 2, operation 208). The search engine 116 may be any kind of search engine, such as any commercially available search engine. The dataset 118 may be any kind of dataset, such as a database of documents (e.g., patents) or a collection of Web pages on the Internet.

The search engine 116 may, for example, perform one search for each query in the queries 114 to produce one set of search results corresponding to each such query, and then combine the resulting sets of search results to produce the search results 120.

The search engine 116 may use any technique(s) to search the dataset 118 using the queries 114. For example, the search engine 116 may use one or more of the queries 114 as natural language queries to search the dataset 118. As another example, the search engine 116 may use one or more of the queries 114 as structured queries (e.g., in cases in which the queries 114 contain Boolean operators, such as AND, OR, and NOT) to search the dataset 118. As these examples imply, the search engine 116 may treat a record in the dataset 118 as a record that matches a particular one of the queries 114 even if the record does not contain a verbatim copy of the query. For example, the search engine 116 may consider the query "reduce vibrations" to be matched by phrases such as "reduce high-frequency vibrations" and "reduce some of the vibrations." The extent to which a dataset record may differ from a query yet still be treated by the search engine 116 as matching the query (e.g., the number of words that may occur between subject and predicate, predicate and object, or subject and object) may be adjustable by the user 102. These particular examples are provided merely as illustrations and not as limitations of the present invention. More generally, the search engine 116 may use any search techniques to perform the functions disclosed herein.

Although the search engine 116 may search the entire dataset 118, this is not a requirement of the present invention. Alternatively, for example, the search engine 116 may search only a subset of the dataset 118, such as a subset of the records in the dataset 118, or a portion of each of some or all of the records in the dataset 118. For example, if the dataset 118 is a database of patents, then the search engine 116 may search only the claims section of each of the patents in the dataset 118. The user 102 may, for example, specify, in the original query 104, which portion of the dataset 118 is to be searched by the search engine 116. Such subset-specifying information may be carried over to one or more of the queries 114, which may therefore specify which portion of the dataset 118 is to be searched by the search engine 116.

The search results 120 may, for example, be or be derived from a subset of the dataset 118. For example, the search results 120 may be a subset of the dataset 118 that has properties that satisfy one or more of the queries 114. For example, the dataset 118 may include a plurality of data records, such as a plurality of documents. If one of the queries 114 matches one of the plurality of documents, then the search engine 116 may copy the matching document into the search results 120, include a reference to the matching document into the search results 120, or include a summary of or other information derived from the matching document in the search results 120.

The system 100 may also include a search result processor 122, which may process the search results 120 in any of a variety of ways to produce processed search results 124 (FIG. 2, operation 210). For example, the search result processor 122 may remove (filter) certain data records from the search results 120 to produce the processed search results 124. This filtering may, for example, be performed based on input received from the user 102, such as one or more of the following: prepositions, adjectives, adverbs, additional noun phrases (i.e., in addition to the subject and object in a query), and additional verb phrases (i.e., in addition to the predicate in a query). For example, if one of the queries 114 is "fluid reduces vibrations," then the user 102 may input the additional phrase, "under low temperature." The prepositional phrase, "under low temperature" consists of a preposition ("under") and a noun phrase ("low temperature"). In turn, the noun phrase consists of an adjective ("low") and a noun ("temperature"). These terms may be used by the search result processor 122 to filter the search results 120 by removing from the search results 120 any results that do not satisfy the additional constraints specified by the phrase, "under low temperature," and thereby to produce the processed search results 124.

As another example, the search result processor 122 may sort the search results 120 to produce the processed search results 124. For example, the search result processor may re-order the search results so that data records which resulted from performing the original query 104 on the dataset 118 appearing lower in the processed search results 124 than data records which resulted from performing queries other than the original query 104 on the dataset 118, so that data records representing information analogous to the problem described by the original query 104 are emphasized to the user 102.

Although the search result processor 122 may sort the search results 120 automatically to produce the processed search results 124, the system 100 may enable the user 102 to manually change the order of the processed search results 124 and otherwise modify the processed search results 124. For example, the system 100 may enable the user 102 to move individual search results up/down in the processed search results 124, mark individual search results as relevant/irrelevant, mark individual search results as favorites, or otherwise tag individual search results with any kind of data (such as indicates of categories or colors).

The system 100 may provide output representing the processed search results 124 (or, if the system 100 does not include the search result processor 122, output representing the original search results 120) to the user 102 (FIG. 5, operation 212). The system 100 may provide the output representing the processed search results 124 to the user 102 in any of a variety of ways, such as by displaying output representing the processed search results 124 on a display screen, e.g., in the form of textual summaries of the processed search results 124 or in the form of a graph illustrating features of the processed search results 124.

The techniques disclosed above may be repeated any number of times. For example, the user 102 may use the system 100 to perform additional searches on the processed search results 124 instead of the dataset 118. In other words, the user 102 may use the system 100 in the manner described above to perform an initial set of searches on the dataset 118 to produce the processed search results 124, and then use the system 100 in the manner described above to perform one or more additional sets of searches on the processed search results 124, thereby refining the initial set of processed search results 124. Such additional searches may be performed using queries that differ from the initial set of queries in any of a variety of ways. For example, the user 102 may perform any one or more of the following to produce a new query: (1) arbitrarily add terms to the original query 104, such as conditions that restrict terms in the original query (e.g., by adding the condition ">1800 Hz" to the term "vibrations" to restrict the search to vibrations greater than 1800 Hz); (2) add/replace terms in the original query 104 with synonyms (e.g., hypernyms and/or hyponyms) of such terms; and (3) combine the query 104 with one or more other queries. The system 100 may then use the new query to produce a modified set of queries using the techniques disclosed above and then to perform searches on the processed search results 124 using the modified set of queries and thereby to produce yet further processed search results.

The system 100 may assist the user 102 in producing such new queries in any of a variety of ways. For example, after performing the initial set of searches using the original query 104, the system 100 may display the original query 104 to the user 102 and enable the user 102 to browse synonyms (e.g., hypernyms and/or hypernyms) of each term in the query 104, such as by displaying such synonyms in a hierarchy in the manner described above. The user 102 may then select any such synonym and thereby generate a new query which is identical to the new query 104 except that the synonym selected by the user replaces the original term.

The system 100 may store a record of all queries used by the user 102 and enable the user 102 to view all such queries in the record. The user 102 may select any query from the record and instruct the system to perform a search using the selected query, either on the same dataset 118, an updated version of the dataset 118, or a different dataset. The user 102 may also select any query from the record, modify the selected query using any of the techniques disclosed herein, and then instruct the system to perform a search using the selected query, either on the same dataset 118, an updated version of the dataset 118, or a different dataset.

Although FIGS. 1 and 2, and the examples described above, envisage the use of a single original query 104, this is merely an example and does not constitute a limitation of the present invention. The user 102 may provide a plurality of original queries (such as "reduce vibrations" and "maintain strength"). The techniques disclosed herein may then be applied to each such original query to provide a plurality of queries for each of the original queries. For example, assume that the user 102 provides a first original query and a second original query, which causes the system 100 to produce a first set of final queries and a second set of final queries, respectively. The system 100 may then create a derived query by selecting one of the queries in the first set of final queries and one of the queries in the second set of final queries, and combine the selected queries using a logical operator (e.g., AND, OR, NOT, or XOR). The system 100 may then search the dataset 118 using the derived query to produce search results 120. The system 100 may perform any number of such searches using any combinations of queries from the first and second sets of queries.

Embodiments of the present invention have a variety of advantages. For example, embodiments of the present invention may be used to find information that is analogous to solutions to the problem represented by the user's original query 104. Consider, for example, a query of the form "predicate object," such as "reduce vibrations." Embodiments of the present invention may perform searches using queries that are synonyms of "reduce vibrations" to find data that may be used to answer the question, "What physical objects have the effect of reducing vibrations?"

Now consider, for example, a query of the form "subject predicate," such as "fluid reduces." Embodiments of the present invention may perform searches using queries that are synonyms of "fluid reduces" to find data that may be used to answer the question, "What does fluid reduce?" If the query is generalized even further to take the form "fluid <verbPhrase>," where <verbPhrase> is a token that is used as a wildcard that is matched by any verb phrase in the dataset 118 (not merely verb phrases that are synonyms of "reduces"), then embodiments of the present invention may perform searches using such a query to find data that may be used to answer the question, "What are the effects of a fluid?" Similarly, if the query is generalized to take the form "<nounPhrase> reduces," where <nounPhrase> is a token that is used as a wildcard that is matched by any noun phrase in the dataset (not merely noun phrases that are synonyms of "fluid"), then embodiments of the present invention may perform searches using such a query to find data that may be used to answer the question, "What are the known things that have the effect of reducing another thing?"

Now consider, for example, a query of the form "<nounPhrase1> <nounPhrase2>," such as "fluid vibrations." Embodiments of the present invention may perform searches using queries that include synonyms of "fluid" and "vibrations" to find data that may be used to answer the question, "What is the functional relationship between fluid and vibrations?" Such searches may, for example, be used to discover the verb phrase (e.g., "reduces") that links "fluid" to "vibrations."

Now consider, for example, a query of the form "<verbPhrase> object," such as "<verbPhrase> vibrations," where <verbPhrase> is a token that is used as a wildcard that is matched by any verb phrase in the dataset. Embodiments of the present invention may perform searches using such a query to find data that may be used to answer the question, "What things effect a change on vibrations?"

Now consider, for example, a query of the form "predicate <nounPhrase>," such as "reduces <nounPhrase>," where <nounPhrase> is a token that is used as a wildcard that is matched by any noun phrase in the dataset. Embodiments of the present invention may perform searches using such a query to find data that may be used to answer the question, "What things have the effect of reducing another thing?"

Now consider, for example, a query of the form "subject predicate object," such as "fluid reduces vibrations." Embodiments of the present invention may perform searches using such a query to find data that may be used to answer the question, "What things semantically synonymous to 'fluid' and 'vibrations' have a relationship that is semantically synonymous to 'reduces'?"

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

What is claimed is:

1. A method performed by at least one computer processor, the method comprising:

(A) obtaining, from a user, first data representing a first part of a sentence, wherein the first part of the sentence comprises a first one of a subject, a predicate, and an object;
   (B) obtaining, from the user, second data representing a second part of the sentence, wherein the second part of the sentence comprises a second one of the subject, the predicate, and the object;
   (C) identifying a synonym of the first part of the sentence;
   (D) identifying a synonym of the second part of the sentence;
   (E) forming a first query from the synonym of the first part of the sentence and the synonym of the second part of the sentence, comprising:
      (E)(1) selecting a first form for the first query, wherein the first form specifies a first one of the following sequences:
      subject, predicate, object;
      subject, predicate;
      subject, object;
      predicate, object;
      (E)(2) forming the first query in the first form the forming comprising:
         (E)(2)(a) if the first form specifies the sequence subject, predicate, object, then forming the first query to include a subject followed by a predicate followed by an object, wherein the subject, predicate, and object are selected from the first part of the sentence, the second part of the sentence, the synonym of the first part of the sentence, and the synonym of the second part of the sentence;
         (E)(2)(b) if the first form specifies the sequence subject, predicate, then forming the first query to include a subject followed by a predicate, wherein the subject and predicate are selected from the first part of the sentence, the second part of the sentence, the synonym of the first part of the sentence, and the synonym of the second part of the sentence;
         (E)(2)(c) if the first form specifies the sequence subject, object, then forming the first query to include a subject followed by an object, wherein the subject and object are selected from the first part of the sentence, the second part of the sentence, the synonym of the first part of the sentence, and the synonym of the second part of the sentence; and
         (E)(2)(d) if the first form specifies the sequence predicate, object, then forming the first query to include a predicate followed by an object, wherein the predicate and object are selected from the first part of the sentence, the second part of the sentence, the synonym of the first part of the sentence, and the synonym of the second part of the sentence; and
   (F) searching a dataset in memory using the first query to identify a first subset of the dataset;
   (G) providing, to the user, executed by the computer processor, output representing the subset of the dataset wherein the sentence differs from the first query.

2. The method of claim 1, wherein the first data comprises first text in a text string obtained from the user, wherein the second data comprises second text in the text string obtained from the user, and wherein the first text occurs before the second text in the text string.

3. The method of claim 1, wherein (B) comprises identifying a hypernym of the first part of the sentence.

4. The method of claim 1, wherein (C) comprises identifying a hypernym of the second part of the sentence.

5. The method of claim 1, wherein (B) comprises identifying a hyponym of the first part of the sentence.

6. The method of claim 1, wherein (C) comprises identifying a hyponym of the second part of the sentence.

7. The method of claim 1, wherein (C) comprises:
(C)(1) identifying a plurality of synonyms of the first part of the sentence;
(C)(2) providing output representing the plurality of synonyms of the first part of the sentence; and
(C)(3) receiving user input selecting one of the plurality of synonyms of the first part of the sentence.

8. The method of claim 1, wherein (D) comprises:
(D)(1) identifying a plurality of synonyms of the second part of the sentence;
(D)(2) providing output representing the plurality of synonyms of the second part of the sentence; and
(D)(3) receiving user input selecting one of the plurality of synonyms of the second part of the sentence.

9. The method of claim 1, further comprising:
(G) filtering the subset of the dataset to produce a filtered subset of the dataset.

10. The method of claim 9, further comprising:
(H) before (G), receiving input from a user;
wherein (G) comprises filtering the subset of the dataset based on the input received from the user.

11. The method of claim 1, wherein the first part of the sentence comprises the predicate, and wherein the second part of the sentence comprises the object.

12. The method of claim 1, wherein the first part of the sentence comprises the subject, and wherein the second part of the sentence comprises the object.

13. The method of claim 1, wherein the first part of the sentence comprises the subject, and wherein the second part of the sentence comprises the predicate.

14. The method of claim 1, wherein the first part of the sentence comprises the predicate, and wherein the predicate comprises a variable representing any verb phrase.

15. The method of claim 1, wherein the first part of the sentence comprises the subject, and wherein the subject comprises a variable representing any noun phrase.

16. The method of claim 1, wherein the first part of the sentence comprises the object, and wherein the object comprises a variable representing any noun phrase.

17. The method of claim 1:
wherein the first part of the sentence comprises a subject;
wherein the second part of the sentence comprises a predicate;
wherein the subject occurs after the predicate in the sentence; and
wherein the predicate occurs after the subject in the query.

18. The method of claim 1, further comprising:
(G) forming a second query from the synonym of the first part of the sentence and the synonym of the second part of the sentence, comprising:
(G)(1) selecting a second form for the second query, wherein the second form specifies a second one of the following sequences:
subject, predicate, object;
subject, predicate;
subject, object;
predicate, object;
(G)(2) forming the second query in the second form from at least two of the first part of the sentence, the second part of the sentence, the synonym of the first part of the sentence, and the synonym of the second part of the sentence; and
(H) searching the dataset using the second query to identify a second subset of the dataset;
wherein the second form differs from the first form.

19. A non-transitory computer-readable medium comprising computer program instructions, wherein the computer program instructions are executable by a computer processor to perform a method comprising:
(A) obtaining, from a user, first data representing a first part of a sentence, wherein the first part of the sentence comprises a first one of a subject, a predicate, and an object;
(B) obtaining, from the user, second data representing a second part of the sentence, wherein the second part of the sentence comprises a second one of the subject, the predicate, and the object;
(C) identifying a synonym of the first part of the sentence;
(D) identifying a synonym of the second part of the sentence;
(E) forming a first query from the synonym of the first part of the sentence and the synonym of the second part of the sentence, comprising:
(E)(1) selecting a first form for the first query, wherein the first form specifies a first one of the following sequences:
subject, predicate, object;
subject, predicate;
subject, object;
predicate, object;
(E)(2) forming the first query in the first form the forming comprising:
(E)(2)(a) if the first form specifies the sequence subject, predicate, object, then forming the first query to include a subject followed by a predicate followed by an object, wherein the subject, predicate, and object are selected from the first part of the sentence, the second part of the sentence, the synonym of the first part of the sentence, and the synonym of the second part of the sentence;
(E)(2)(b) if the first form specifies the sequence subject, predicate, then forming the first query to include a subject followed by a predicate, wherein the subject and predicate are selected from the first part of the sentence, the second part of the sentence, the synonym of the first part of the sentence, and the synonym of the second part of the sentence;
(E)(2)(c) if the first form specifies the sequence subject, object, then forming the first query to include a subject followed by an object, wherein the subject and object are selected from the first part of the sentence, the second part of the sentence, the synonym of the first part of the sentence, and the synonym of the second part of the sentence; and
(E)(2)(d) if the first form specifies the sequence predicate, object, then forming the first query to include a predicate followed by an object, wherein the predicate and object are selected from the first part of the sentence, the second part of the sentence, the synonym of the first part of the sentence, and the synonym of the second part of the sentence; and
(F) searching a dataset in memory using the first query to identify a first subset of the dataset;

(G) providing, to the user, executed by the computer processor, output representing the subset of the dataset wherein the sentence differs from the first query.

20. The non-transitory computer-readable medium of claim 19, wherein the first data comprises first text in a text string obtained from the user, wherein the second data comprises second text in the text string obtained from the user, and wherein the first text occurs before the second text in the text string.

21. The non-transitory computer-readable medium of claim 19, wherein (B) comprises identifying a hypernym of the first part of the sentence.

22. The non-transitory computer-readable medium of claim 19, wherein (C) comprises identifying a hypernym of the second part of the sentence.

23. The non-transitory computer-readable medium of claim 19, wherein (B) comprises identifying a hyponym of the first part of the sentence.

24. The non-transitory computer-readable medium of claim 19, wherein (C) comprises identifying a hyponym of the second part of the sentence.

25. The non-transitory computer-readable medium of claim 19, wherein (C) comprises:
    (C)(1) identifying a plurality of synonyms of the first part of the sentence;
    (C)(2) providing output representing the plurality of synonyms of the first part of the sentence; and
    (C)(3) receiving user input selecting one of the plurality of synonyms of the first part of the sentence.

26. The non-transitory computer-readable medium of claim 19, wherein (D) comprises:
    (D)(1) identifying a plurality of synonyms of the second part of the sentence;
    (D)(2) providing output representing the plurality of synonyms of the second part of the sentence; and
    (D)(3) receiving user input selecting one of the plurality of synonyms of the second part of the sentence.

27. The non-transitory computer-readable medium of claim 19, wherein the method further comprises:
    (G) filtering the subset of the dataset to produce a filtered subset of the dataset.

28. The non-transitory computer-readable medium of claim 27, wherein the method further comprises:
    (H) before (G), receiving input from a user;
    wherein (G) comprises filtering the subset of the dataset based on the input received from the user.

29. The non-transitory computer-readable medium of claim 19, wherein the first part of the sentence comprises the predicate, and wherein the second part of the sentence comprises the object.

30. The non-transitory computer-readable medium of claim 19, wherein the first part of the sentence comprises the subject, and wherein the second part of the sentence comprises the object.

31. The non-transitory computer-readable medium of claim 19, wherein the first part of the sentence comprises the subject, and wherein the second part of the sentence comprises the predicate.

32. The non-transitory computer-readable medium of claim 19, wherein the first part of the sentence comprises the predicate, and wherein the predicate comprises a variable representing any verb phrase.

33. The non-transitory computer-readable medium of claim 19, wherein the first part of the sentence comprises the subject, and wherein the subject comprises a variable representing any noun phrase.

34. The non-transitory computer-readable medium of claim 19, wherein the first part of the sentence comprises the object, and wherein the object comprises a variable representing any noun phrase.

* * * * *